Sept. 18, 1951 H. A. STAMPER 2,568,306

STYLUS STRUCTURE FOR ELECTRICAL RECORDERS

Filed Oct. 3, 1949

INVENTOR.
H. A. STAMPER
BY
[signature]
ATTORNEY

Patented Sept. 18, 1951 2,568,306

UNITED STATES PATENT OFFICE 2,568,306

STYLUS STRUCTURE FOR ELECTRICAL RECORDERS

Hamilton Alan Stamper, North Hollywood, Calif., assignor to Bendix Aviation Corporation, South Bend, Ind., a corporation of Delaware Application October 3, 1949, Serial No. 119,286

3 Claims. (Cl. 346—139)

This invention relates to stylus structures for electrical recorders of the type in which a metal stylus is moved across a paper record blank.

Heretofore, substantially straight pieces of spring wire have been used as styli in such recorders and have been releasably clamped in holders that permitted manual extension of the wire from the holder at intervals to compensate for wearing away of the tip of the wire contacting the paper. Such styli had the defects of being of limited length and of being difficult to adjust. Because of the difficulty of adjustment, adjustments were made as infrequently as possible. However, in order to maintain accuracy of recording, adjustment should be made when the tip of the stylus has been worn away not more than about $\frac{1}{16}$ of an inch, which amount of wear can take place in about eight hours of continuous operation. Even with such lapse of time between adjustments, prolonged flexing of the wire at the same region thereof can cause breakage. More frequent adjustment is desirable to maintain accuracy of recording and prevent breakage of the wire.

In addition to the difficulty of adjustment, the prior styli required frequent replacement, because of their limited length. Frequent replacement is objectionable, not only because of the time required to replace the stylus, but because a new stylus is frequently of a slightly different shape than the old stylus and necessitates a lateral adjustment as well as adjustment for length.

An object of the invention is to provide a stylus structure in which the effective length of the stylus is easily adjusted so that it is practicable to make frequent adjustments, thereby maintaining the stylus of substantially constant length, which increases the accuracy of recording, and also frequently shifting the portion subject to flexure, so that breakage is reduced.

Another object of the invention is to provide a stylus structure enabling the use of a stylus wire of substantial length, so that replacement of the stylus wire need be made only at very long intervals.

Other more specific objects and features of the invention will become apparent from the description to follow of a specific embodiment of the invention.

Briefly, the present invention comprises a stylus wire of substantial length which is wound about a rotatable drum, with the active end projecting tangentially from the drum through suitable guides onto the record paper blank. The drum is normally restrained from rotation by friction, but can be rotated manually to extend or retract the active end of the stylus wire. The stylus wire is of spring material such as stainless steel, and has sufficient elasticity so that it is not deflected beyond its elastic limit when wrapped about the drum. Therefore it feeds tangentially from the drum in substantially straight condition. Unless special provision were made to prevent it, a spring wire would not remain wrapped around the drum in the manner described, and an important feature of the invention is the embedding of the coiled spring wire in a matrix of yieldable plastic material on the drum. The plastic material is of such nature relative to the material of the drum that it adheres strongly thereto, but does not adhere to the stylus wire. As a result, the wire pulls out of the matrix as it feeds tangentially off the drum, and remains in clean condition, all of the plastic remaining on the drum. The drum is preferably frictionally restrained from rotation, so that it normally remains in fixed position, but it can be turned manually in one direction to feed the wire therefrom, or in reverse direction to retract the wire if it has been inadvertently extended too far. Such adjustment requires no tools and no tightening or loosening of clamping screws, and can be very quickly and easily performed, so that there is less tendency on the part of the operator to postpone adjustment as long as possible, than was the case with the prior known styli that have been mentioned.

A complete understanding of the invention may be had from the following detailed description with reference to the drawing, in which.

Figures 1, 2, 3, 4, 5:
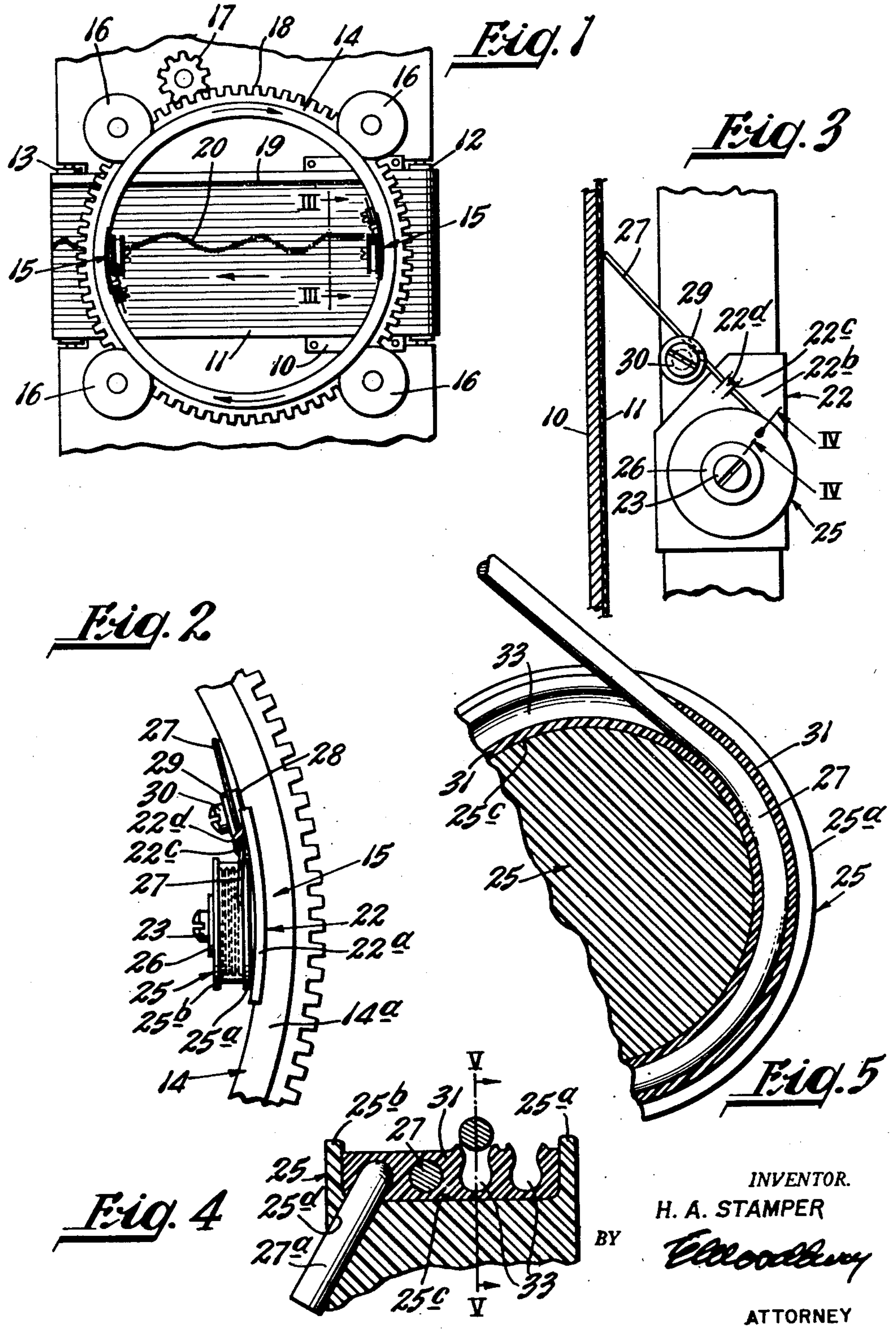
Fig. 1 is a front elevational view of a portion of a depth recorder incorporating a stylus structure in accordance with the invention.
Fig. 2 is a detail front elevational view of one of the stylus structures incorporated in the recorder shown in Fig. 1.
Fig. 3 is a detail side elevational view, partly in section, taken in the plane III—III of Fig. 1.
Fig. 4 is a detail section through the rim portion of the stylus drum, the section being taken in the plane IV—IV of Fig. 3.
Fig. 5 is a detail sectional view taken in the plane V—V of Fig. 4.

Referring to Fig. 1, there is shown a portion of a depth recorder for measuring water depth, utilizing supersonic waves reflected from the bottom. The recorder comprises an electrically conductive plate 10 (Fig. 3) over which a paper record tape 11 of known type is drawn, this tape being slowly unwound from a spool 12 and wound onto a spool 13, as indicated by the arrow in Fig. 1. Mounted in front of the paper tape 11 is a stylus support consisting of a rotatable ring 14 which carries one or two stylus assemblies 15. In Fig. 1, two assemblies are shown mounted at diametrically opposite points on the ring 14, but the number of assemblies employed has nothing to do with the present invention. The ring 14 is supported for rotation by four idler wheels 16 so that the space within the ring is unobstructed. The ring is rotated by any suitable driving mechanism through a drive pinion 17 which meshes with gear teeth 18 on the outer periphery of the ring 14. The idler wheels 16 and the drive pinion 17 may be of rubber or other electrical insulating material, so that the ring 14 is insulated from the rest of the machine, and electrical connection to the ring may be made by a brush bearing thereon, which does not appear in the drawing. In operation, the ring 14 is rotated at a constant speed synchronized with the transmission of impulses into the water, so that as each stylus on the ring passes over the upper edge of the paper tape 11, an impulse is transmitted into the water, and an electrical discharge is simultaneously applied to the stylus so as to record a base line 19 near the upper margin of the tape 11. Actually, this line 19 consists of a series of short arcuate marks, but the marks can be so close together, by properly choosing the speed of the paper tape 11 relative to the speed of rotation of the ring 14, that a continuous line is formed. The operation of the depth recorder is such that the echo of the transmitted impulse is amplified and caused to apply an electrical potential to the stylus and the speed of the ring 14 is such that the stylus is still moving over the tape 11 at the time the echo impulse is received. The received impulses therefore produce a line 20 on the tape 11, the distance of which from the line 19 is a measure of the depth of the water. The present invention, as previously indicated, resides in the stylus structure only and is not limited to any particular field of operation, such as depth recording, the illustration being chosen at random.

Referring to Figs. 2 and 3, each of the stylus structures 15 comprises a sheet metal plate member 27 secured to the ring 14 by a screw 23. This plate 22 is cylindrically curved to conform to the curvature of the inner face of the ring 14, and is preferably provided with flanges 22*a* at its opposite edges which engage the front and rear faces 14*a* of the ring 14 to prevent the plate from twisting, even though it is held by only the single screw 23.

The screw 23 also supports a drum 25, the inner end face 25*a* of which may be convex to conform to the curvature of the inner face 22*b* of the plate 22, so that it contacts the latter along a line in the plane of the ring 14. A spring washer 26 is positioned between the head of the screw 23 and the adjacent face 25*b* of the drum 25 to maintain sufficient friction on the drum to retain it in whatever rotative position into which it may be turned.

The stylus comprises a spring wire 27, the major portion of which is wrapped around the periphery 25*c* of the drum 25, one end of the wire extending tangentially from the drum through a guide passage 22*c* formed in the plate 22 and thence between a pair of guide washers 28 and 29 on a screw 30 that is screwed into the ring 14 near the rear edge thereof, the end of the wire 27 being so positioned as to drag across the paper 11, as shown in Fig. 3. The passage 22*c* may be conveniently formed by pressing out a small section 22*d* of the plate 22. It will be observed from Fig. 3 that the wire extends substantially straight and tangent to the drum 25 in the tangential plane. However, in the plane at right angles thereto, the wire may have a bend introduced into it by its passage through the passage 22*c* and between the washers 28 and 29, because of the curvature of the ring 14. However, the deflections introduced into the wire by the passage 22*c* and the washers 28 and 29 do not exceed the elastic limit of the wire, so that it extends substantially straight from its point of contact with the washers 28 and 29 to the tip which drags across the paper 11.

Referring to Fig. 4, it will be observed that the turns of the wire 27 that are wrapped around the drum 25 are embedded in a plastic matrix 31. Various materials may be employed for this matrix, the requirements being that it shall be sufficiently soft to permit the wire to feed tangentially off the drum, but sufficiently stiff to retain the wire in place at all other points. It should also have the characteristic of being strongly adherent to the drum 25 but not adherent to the stylus wire 27, because it is desired that the stylus wire have no plastic adhering to it after it has fed off the drum. These requirements can be readily met by forming the drum 25 of solid phenolic plastic material and forming the plastic matrix 31 by painting the rim of the drum with a solution of ethyl cellulose in acetone. A thin layer of the matrix material is preferably formed on the surface of the drum before the stylus wire 27 is placed thereon. The wire is then wrapped on top of the thin layer and forcibly held in place by any convenient procedure while additional coats of the ethyl cellulose in acetone are applied to completely embed the turns in the plastic, as shown in Fig. 4. When the acetone has evaporated, the plastic matrix left (as shown in Fig. 4) functions to hold the wire in place despite its natural resiliency.

It is convenient to secure the tail end 27*a* (Fig. 4) of the stylus wire in place during the mounting operation by bending it at right angles and extending it through a hole 25*d* in the drum 25.

To install a new stylus, a drum 25 having stylus wire 27 wrapped thereon and embedded in a plastic matrix as described is secured to the ring 14 by means of the screw 23, the screw being tightened to a point where the drum 25 can just be turned manually. The free end of the stylus wire 27 is then pulled out of the matrix 31 and threaded through the passage 22*c* and between the guide washers 28 and 29 while being projected from the drum 25 by manual rotation of the latter.

As shown in Figs. 4 and 5, as the wire 27 leaves the drum tangentially, it splits the plastic 31 immediately thereabove and pulls clear of the plastic, leaving a furrow 33 in the plastic. As the tip of the stylus wears away, additional stylus wire is fed off the drum by rotating the latter, such rotation being effected by simply pressing the edge of the drum with the thumb and slightly rotating it. Because of the fact that the wire leaves the drum tangentially it is gripped by the plastic 31 up to its point of emergence therefrom and can be accurately fed either forward or backward (through a small distance) by rotation of the drum in one direction or the other. In practice, the drum may be approximately 1 inch in diameter, so that three or four turns of stylus wire thereon may have a total length of approximately 1 foot. Such a length of stylus wire will normally have a life measured by years, in normal service in a depth recorder of the type disclosed.

It has been previously mentioned that the length of the stylus wire must be accurately adjusted if accurate recordings are to be made. Furthermore, when two or more stylus structures are mounted on the ring 14, as shown in Fig. 1, the styli must be all of the same length if the lines 19 and 20 are to be of minimum width. This will be apparent from consideration of the fact that if one of the two styli is longer than the other, successive line increments constituting the line 19 or the line 20 will not be coextensive with each other but will be staggered, so that the line cannot be held to its desired minimum width. Adjustment is usually made by trial and can be very quickly made with the stylus structure of the present invention because of the fact that no screws or nuts need to be loosened, the only operation being that of shifting the drum 25 with the thumb as described.

It is to be understood that it is also possible to retain the stylus in adjusted position by friction at the passage 22c and/or at the washers 28 and 29, instead of by the frictional resistance to rotation of the drum 25, although the latter method appears the most practicable.

Furthermore, although only a single layer of wire is shown on the drum 25, multiple layers may be used if additional capacity of wire is required.

Although for the purpose of explaining the invention, a particular embodiment thereof has been shown and described, obvious modifications will occur to a person skilled in the art, and I do not desire to be limited to the exact details shown and described.

I claim:

1. A stylus structure for an electrical recorder having a stylus support movable through a path parallel to a recording surface, said stylus structure comprising: guide means on said support for laterally supporting a stylus wire extending therepast into recording relation with said surface; a drum member rotatably mounted on said support and having a length of stylus wire wound thereon and having one end extending substantially tangentially from the drum past said guide means to the recording surface, and a yieldable matrix on said drum in which said stylus wire is embedded.

2. A stylus structure according to claim 1 in which said yieldable matrix is more adherent to said drum than to said wire.

3. A stylus structure according to claim 1 in which said drum and matrix are non-metallic plastic materials and said stylus wire is of metal.

HAMILTON ALAN STAMPER.

REFERENCES CITED

The following references are of record in the file of this patent:

UNITED STATES PATENTS

| Number | Name | Date |
|---|---|---|
| 1,367,956 | Frisbie et al. | Feb. 8, 1921 |
| 1,380,089 | Willat | May 31, 1921 |
| 1,786,232 | Eigenheer | Dec. 23, 1930 |

FOREIGN PATENTS

| Number | Country | Date |
|---|---|---|
| 603,208 | Great Britain | June 10, 1948 |